July 12, 1932.    E. WIRSCHITZ    1,867,043

CLAMPING MEANS

Filed Sept. 5, 1930

Inventor:

Patented July 12, 1932

1,867,043

UNITED STATES PATENT OFFICE

EDUARD WIRSCHITZ, OF MUNICH, GERMANY

CLAMPING MEANS

Application filed September 5, 1930, Serial No. 479,965, and in Germany September 10, 1929.

This invention refers broadly to clamping devices and in particular to clamping means to be employed for the securing in position of electric conduits or cords in clamping means and more particularly in connection with so-called "straining clamps" for freely suspended electric conduits, cable-connecting means and the like in which the member to be secured in position of the conduit is clamped by wedge-like operating means in a hollow conical seating device. In accordance with previous suggestions wedges have been employed which could operate independently of each other. The manipulation of such loose clamping wedges, however, is extremely difficult, so that clamping devices which were based on this principle, proved practically unavailable in operation. In order to overcome this difficulty it has been suggested to dispose the wedges in a spring-acting ring, but there was still the inconvenience that the separable wedges being independent of each other, became readily disengaged, so as to interfere with the manipulation of such devices. Moreover, in spring-operating rings the wedges assembled therein failed to possess the necessary relative movability, while being engaged with a ring, so that it was difficult to cause the wedges to become automatically adjusted to the proper position in the hollow cone and along the conduit, and to rely upon the clamping and tightening action being produced merely or mainly by the tension of the conduit or conductor. Now, all these drawbacks are avoided in this invention by the fact that the wedges on which the clamping action depends and which are seated in the hollow cone will, when assembled constitute a perforated cone and are connected into a kind of chain by means of flexible connecting means upon which the wedges are mounted.

Figure 1:
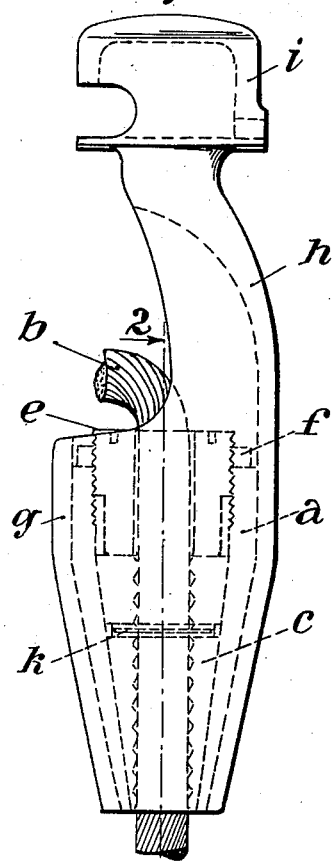
Figure 2:
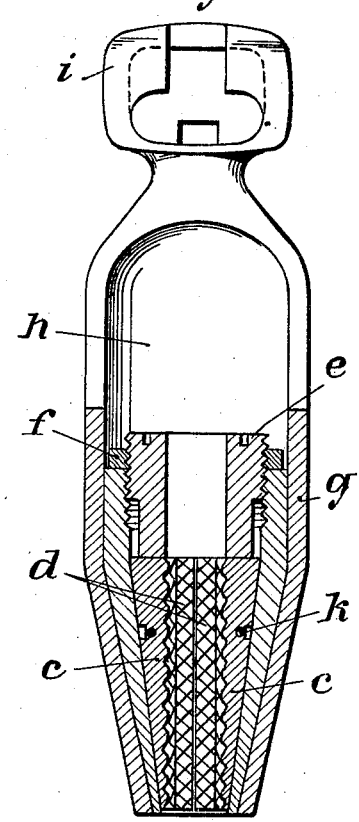
Figure 3:
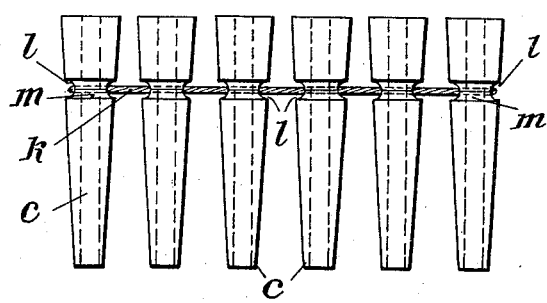

The invention will be more fully described by reference to the accompanying drawing showing by way of exemplification an embodiment of the principles of the invention as applied to a straining clamp for high-voltage conductors. Fig. 1 is a side-elevation of the straining clamp; Fig. 2 is a front view with parts in longitudinal section of the clamp on the line 2—2 of Fig. 1 and without the conductor. Fig. 3 is a detail showing the bundled clamping wedges mounted on the flexible connecting means..

The straining clamp according to Figs. 1 and 2 comprises the hollow conical seating or packing member $a$ in which, for the purpose of clamping the conductor $b$ in the desired position circularly assembled clamping wedges $c$ with roughened interior surface $d$ are inserted which may be forced into engagement with the hollow cone $a$ by means of a screw-threaded sleeve $e$. An annulus $f$ serves for securing the sleeve $e$ in its position. The entire device is seated in a supporting or housing sleeve $g$ which is provided with a trunco-conical lower extension and with a preferably trough-shaped pocket-like inserting recess $h$ and with a socketed jack, ear or the like $i$, adapted for the suspension of the complete device. With a view of uniting the important parts of the clamping means, that is to say, wedges $c$ to each other without interfering with their individual movability, the wedges are serially disposed on a flexible metal wire-cord or stranded wire $k$, as shown in Fig. 3, and are frictionally fastened thereto, so as to constitute a kind of open chain, the links of which are equally spaced from each other and are each connected to a clamping wedge $c$. This relative spacing of the several wedges upon the cord or cable disposed in a recessed portion thereof is arranged in accordance with the taper of the conical bore of the hollow cone or packing member $a$ in such a manner as to allow of the wedges $c$ sufficiently approaching or moving away from each other, and corresponding to the depth of insertion of the wedges into the seating cone or packing member $a$. In this operation the sections of the cord $k$ between the wedges $c$ are likely to be bent outwards, sufficient play for this purpose being provided at the edges of the wedges by providing the notches $l$. The assembling of the wedges $c$ on the wire cord $k$ may be effected for instance by providing the outer surface of the wedges $c$ with a counter-sunk groove $m$ into which the cord $k$ is forced.

For the purpose of applying the clamping device, the chain formed by the wedges is taken hold of by the operator with his palm, and by then closing his hand he can easily place them around the conductor $b$ in such a manner that the wedges $c$ are immediately placed in their relative proper positions and will simultaneously descend into the hollow cone or packing member $a$ without any liability of one or the other wedge dropping out. In view of the cord $k$ being disposed in a counter-sunk recess in the wedges $c$ and owing to its movable arrangement within the spaces between the wedges, there will be no danger of the cord interfering with the clamping action.

It should be understood that the device may be used broadly for uniting conductors, ropes and similar connecting and suspending means to each other or to other members, and that the invention is not confined to the particular form and construction of embodiment herein shown and described by way of exemplification and illustration only, and that modifications and changes are possible within the scope of the appended claims.

I claim:

1. In a clamping device the combination with an outer hollow, conical seating member of a plurality of spacedly disposed substantially wedge-shaped clamping members in the interior of the hollow member, engageably extending substantially coaxial therewith and clampingly assembled by the taper of the seating member, and flexible connecting means for the members intermediate the ends thereof, upon which they are spacedly arranged.

2. In a clamping device the combination with an outer hollow, conical seating member of a plurality of spacedly disposed substantially wedge-shaped clamping members in the interior of the hollow member, engageable and substantially in parallelism therewith, outwardly unprojecting flexible connecting means, spacedly connecting the clamping members intermediate the ends thereof and an interior gripping surface complementally disposed on each of the clamping members.

3. In a clamping device the combination with an outer hollow, conical seating member, of a plurality of wedge-shaped clamping members in the interior of the hollow member, substantially in parallelism therewith, outwardly unprojecting flexible connecting means, frictionally secured to the clamping members and spacedly connecting the same, and notched parts at the edges of the wedges adapted for the reception of forced-out portions of the flexible connecting means.

4. In a clamping device the combination with an outer hollow, conical seating member of a plurality of wedge-shaped clamping members in the interior of the hollow member and outwardly engaging therewith, flexible bundling and connecting means between the clamping members near the upper broader parts of said clamping members and on which they are spacedly disposed, and interior complementally circular gripping surfaces on the clamping members.

5. In a clamping device in combination, a sleeve-like supporting member, mounting means at one end of said member, and an inwardly tapering seating extension at the other end of said member, a conical, cross-sectionally ring-shaped packing, displaceably disposed in the seating extension and having a reduced portion, a plurality of similar, substantially wedge-shaped clamping members, mounted in said packing with their narrower ends at the reduced portion of the packing, a recessed part near the broadened portion of the clamping members, and flexible bundling and connecting means engaging the recessed parts and on which the clamping members are spacedly secured, and an axially extending gripping surface on the inside of each of the clamping members.

6. In a clamping device in combination, a substantially sleeve-like supporting and housing member, an upper, vertically disposed and laterally open, substantially trough-shaped pocket-like extension on said member and a lower downwardly conical seating extension on said member, a plurality of substantially wedge-shaped downwardly cross-sectionally reduced clamping members, flexible connecting means between said members to which they are spacedly secured, complemental circular interior gripping surfaces on said clamping members, trunco-conical packing means between the housing and supporting member and the clamping members, and ring-shaped securing and locking means, threadedly secured in the packing means above the clamping members.

In testimony whereof I affix my signature.
EDUARD WIRSCHITZ.